Patented July 5, 1938

2,122,651

UNITED STATES PATENT OFFICE 2,122,651

PROCESS OF PREPARING THYMONUCLEIC ACIDS

Havard L. Keil, Chicago, Ill., assignor to Armour and Company, Chicago, Ill., a corporation of Illinois No Drawing. Application June 29, 1936, Serial No. 88,030

7 Claims. (Cl. 260—34)

This invention relates to the preparation of thymonucleic acids and it comprises processes wherein animal glands and tissues containing nucleic acids are hydrolyzed with an alkaline agent, such as caustic soda, to form a reaction mixture containing salts of nucleic acid, the reaction mixture treated with sulfuric acid to liberate the nucleic acids, and the nucleic acids recovered.

The nucleic acids are substances derived from animal glands and tissues and are useful in the treatment of various bodily conditions. More often they are used in the form of their sodium salts, such as sodium nucleate. This salt can be administered in capsules or pills and can also be used for intramuscular injection.

Ways have already been discovered for isolating the nucleic acids from animal glands. These processes start with the hydrolysis of the gland with an alkaline reagent, such as caustic alkali. The product from such hydrolysis contains sodium nucleate together with a large number of protein impurities. Although it is a simple enough matter to prepare sodium nucleate in admixture with its impurities, it is rather difficult to recover the nucleic acid from such reaction products in a substantially pure state. At the present time, this method of recovery employs large quantities of ethyl alcohol usually acidified slightly with hydrochloric acid. The amount of hydrochloric acid in the alcohol solution is usually about 1 per cent. Although this method will give satisfactory yields of nucleic acids, the method is costly, large volumes of alcohol are necessary, and there are many other disadvantages, such as the necessity for solvent recovery.

I have now discovered a method of isolating nucleic acids which avoids the use of alcohol or other solvent entirely and is consequently a much less expensive process. Moreover, my process gives much higher yields of nucleic acids and permits me to obtain nucleic acids which are entirely free of proteins without requiring exhaustive purification steps. In essence, my invention is based upon the discovery that an aqueous solution of sulfuric acid, usually of about 50 percent strength, is an unusually good reagent for decomposing the reaction mixture obtained when the animal glands are hydrolyzed. When using sulfuric acid many of the impurities normally associated therewith are at once removed. The crude nucleic acids precipitated by the action of the sulfuric acid can then be freed from any remaining impurities with little difficulty.

My process is best explained by describing a detailed procedure which is especially advantageous for the isolation of nucleic acids from lymph glands, and I shall describe my process with especial reference to the treatment of this material. It is to be understood, however, that my invention is not restricted thereto since it can be used in connection with any animal tissue or gland containing commercially practical amounts of nucleic acids.

Fresh thymus glands are finely ground and dried on trays in vacuum at about 150° C. The dried scale-like material is then treated with naphtha or other fat solvent to remove fat. Advantageously this fat extraction proceeds over a period of about 24 hours so that substantially all lipoids are removed. Then the naphtha is drained off and the defatted material warmed to remove any adhering traces of the fat solvent.

The dried defatted glands are finely ground and stirred into six parts by weight, based on the amount of dry glands, of sodium hydroxide solution. Advantageously the solution is about 3 percent strength but I do not wish to be limited to this precise concentration because the strength of the caustic solution can vary over wide limits. In order to facilitate the hydrolysis the reaction mixture is heated to a temperature of about 80° to 95° C. Ordinarily the hydrolysis is completed in about 5 minutes and the reaction mixture is then chilled in a refrigerator. The chilled mixture becomes jelly-like and contains nucleic acids as sodium nucleate.

I next prepare a cold aqueous solution of sulfuric acid containing about 50 percent by weight of the acid. This concentration can vary over wide limits from about 25 to 60 percent, but in order to keep the volume of liquids used as low as possible, I find it best to use a rather strong solution of sulfuric acid. The acid solution is then stirred into the cold gel of sodium nucleate and impurities until the jelly-like character of the mass breaks down and crude nucleic acids are seen to precipitate. The exact amount of sulfuric acid solution to use varies with the character and composition of the hydrolysis reaction product. Generally sulfuric acid is added until the hydrogen ion concentration of the mixture is about pH 4.5. At this value usually all of the nucleic acids separate. The above hydrogen ion concentration is not limiting, however, since more acid can be added. This step in my process is easily controlled by visual inspection. Enough acid is added to insure complete precipitation of crude nucleic acid.

The reaction mixture is then strained through muslin or otherwise filtered and the filtrate discarded. The precipitate collected on the filter is somewhat "rubbery" and it contains, in addition to nucleic acids, small quantities of histone hydrosulfates and protamine hydrosulfates. The rubbery precipitate is kneaded with water to remove any traces of sulfuric acid and the precipitate is then suspended in about twice its volume of water.

The next step is the conversion of the crude nucleic acids to their lime salts. During this step the nucleic acids are freed of practically all protein impurities. To the suspension of crude acids in water I add about 6 to 7 per cent of unslaked lime based on the amount of dry tissue starting material. An excess of lime is not disadvantageous but is wasteful. Any excess can be readily removed as I shall describe. The lime reacts with the nucleic acids to form insoluble calcium nucleate. This reaction is facilitated by heating and stirring the mixture until there is no further precipitation of a grayish insoluble material. Proteins associated with the nucleic acid as impurities are not precipitated as calcium salts. They remain in the alkaline solution. Advantageously the alkaline mother liquor is decanted from the calcium nucleate precipitate, or otherwise separated, as by filtration. The precipitate is then washed several times with water to remove most of the excess calcium hydroxide. After the last washing the mixture is filtered in any convenient manner.

The sludge of calcium nucleate, now substantially free of all impurities, is suspended in an equal volume of water and hydrochloric acid added until the mixture is just slightly acid to blue litmus paper. Hydrochloric acid converts the calcium nucleate to free nucleic acid, the calcium chloride thus formed being soluble in the aqueous mother liquor.

The purified free nucleic acid is then filtered and washed several times with water to remove any traces of hydrochloric acid or calcium chloride. Finally the product is spread in a thin layer on pans and dried in the usual way in vacuum.

Yields are high, averaging from 16 to 19 percent, based on the weight of dry starting material and the product is substantially free of proteins as shown by the biuret reaction.

In contrast to processes hitherto employed it will be noted that I avoid the use of volatile solvents entirely, do not at any time have bulky quantities of fluids, and my reagent cost is relatively insignificant. At the same time, I am able to improve the yield of nucleic acids from a given quantity of glandular material and I am also able to obtain a high purified product.

It will be apparent to those skilled in the art that my process can be varied without departing from its essential features. As noted in the foregoing description, I can vary the strength of caustic soda, temperature of hydrolysis, concentration of sulfuric acid, and similar factors. Likewise, instead of using lime for the precipitation of the thymonucleic acids I can use other alkaline earth metal oxides and hydroxides such as magnesium, strontium, and barium.

Having thus described my invention what I claim is:

1. The process of preparing thymonucleic acids which includes the steps of subjecting glandular material containing nucleic acids to alkaline hydrolysis to form a reaction mixture containing nucleic acid salts and then treating said mixture with sulfuric acid.

2. The process of preparing thymonucleic acids which includes the steps of treating glandular material containing nucleic acids with sodium hydroxide solution to hydrolyze the material and form sodium nucleate and then treating the reaction mixture with a relatively strong sulfuric acid solution.

3. The process of preparing thymonucleic acids which includes the steps of treating lymph glands with dilute sodium hydroxide solution to hydrolyze the glandular material and form sodium nucleate, then treating the reaction mixture with sulfuric acid to precipitate nucleic acids, and freeing the precipitated nucleic acids of protein impurities.

4. The process of preparing thymonucleic acids which includes the steps of treating lymph glands with dilute sodium hydroxide solution to hydrolyze the glandular material and form sodium nucleate, treating the reaction mixture with sulfuric acid to precipitate nucleic acids, treating the nucleic acids with lime while in aqueous suspension to precipitate insoluble calcium nucleate and then converting the calcium nucleate to the free nucleic acids.

5. The process of preparing thymonucleic acids which includes treating a cold gel of the products of alkaline hydrolysis of lymph glands with sulfuric acid to break the gel and liberate nucleic acids therefrom.

6. The process of preparing thymonucleic acids which comprises acidifying with sulfuric acid a cold gel of the products of alkaline hydrolysis of lymph glands, the acidification being continued until the pH of the gel is about 4.5.

7. The process as in claim 6 wherein the sulfuric acid is about a 50 percent solution.

HAVARD L. KEIL.